(12) United States Patent
Neufeld et al.

(10) Patent No.: US 8,421,747 B2
(45) Date of Patent: Apr. 16, 2013

(54) OBJECT DETECTION AND USER SETTINGS

(75) Inventors: Nadav M. Neufeld, Sunnyvale, CA (US); Gionata Mettifogo, Menlo Park, CA (US); Charles J. Migos, San Francisco, CA (US); Afshan A. Kleinhanzl, San Francisco, CA (US)

(73) Assignee: Microsoft Corporation, Redmond, WA (US)

( * ) Notice: Subject to any disclaimer, the term of this patent is extended or adjusted under 35 U.S.C. 154(b) by 388 days.

(21) Appl. No.: 12/236,691

(22) Filed: Sep. 24, 2008

(65) Prior Publication Data
US 2010/0074464 A1 Mar. 25, 2010

(51) Int. Cl.
*G09G 5/00* (2006.01)
(52) U.S. Cl.
USPC ........... 345/156; 345/173; 345/174; 345/175; 345/176; 345/177
(58) Field of Classification Search .................. 345/156, 345/173–184
See application file for complete search history.

(56) References Cited

U.S. PATENT DOCUMENTS

| 7,379,047 | B2 | 5/2008 | Drucker et al. |
| 2003/0132298 | A1* | 7/2003 | Swartz et al. ............ 235/472.02 |
| 2005/0177861 | A1 | 8/2005 | Ma et al. |
| 2005/0251800 | A1* | 11/2005 | Kurlander et al. ............ 717/174 |
| 2006/0044282 | A1 | 3/2006 | Pinhanez et al. |
| 2007/0022437 | A1 | 1/2007 | Gerken |
| 2007/0266413 | A1* | 11/2007 | Davis et al. .................... 725/100 |
| 2008/0098450 | A1* | 4/2008 | Wu et al. ........................ 725/132 |
| 2009/0006958 | A1 | 1/2009 | Pohjola et al. |
| 2009/0091529 | A1* | 4/2009 | Do et al. ........................ 345/156 |

FOREIGN PATENT DOCUMENTS

| JP | 3143474 | 7/2008 |
| WO | 03039141 A1 | 5/2003 |

OTHER PUBLICATIONS

"PCT Search Report and Written Opinion", Application No. PCT/US2009/057885, (Apr. 26, 2010), 12 pages.
Balfanz, et al., "Interaction with Content-Augmented Video via Off-Screen Hyperlinks for Direct Information Retrieval", Retrieved at <<http://wscg.zcu.cz/wscg2002/Papers_2002/E101.pdf>>, pp. 8, date 2002.
Ma, et al., "IDTV Broadcast Applications for a Handheld Device", <<http://ieeexplore.ieee.org/iel5/9179/29118/01312457.pdf?isnumber=29118&prod=STD&arnumber=1312457&arnumber=1312457&arSt=+85&ared=+89+Vol.1&arAuthor=Ma%2C+M.%3B+Wilkes-Gibbs%2C+D.%3B+Kaplan%2C+A.&htry=4u>>, IEEE Communications Society, 2004, pp. 85-89, date Jun. 2004.
Cardoso, et al., "Personalization of Interactive Objects in the GMF4iTV project", Retrieved at <<http://www.di.unito.it/~liliana/TV04/FINAL/merialdo.pdf>>, pp. 11.
Cruickshank, et al., "Making Interactive TV Easier to Use: Interface Design for a Second Screen Approach", Retrieved at <<http://bura.brunel.ac.uk/bitstream/2438/2500/1/Design+Journal_iTV+paper_ET.pdf>>, pp. 14.

(Continued)

*Primary Examiner* — William Boddie
*Assistant Examiner* — Saifeldin Elnafia
(74) *Attorney, Agent, or Firm* — Wolfe-SBMC

(57) ABSTRACT

Object detection and user setting techniques are described. In an implementation, an object placed on a surface of the client is detected by the client. A determination is made as to which of a plurality of users correspond to the detected object. One or more user settings are located that correspond to the determined user.

20 Claims, 5 Drawing Sheets

OTHER PUBLICATIONS

Haque, et al., "Digital Interactive Television Services for Converged IP and DVB Networks", Retrieved at <<http://ieeexplore.ieee.org/iel5/9605/30346/01394693.pdf?isnumber=30346&prod=CNF&arnumber=1394693&arSt=+2151&ared=+2153+Vol.3&arAuthor=Haque%2C+M.+3B+Itagaki%2C+T.%3B+Cosmas%2C+J.&htry=1>>, 2004, IEEE International Conference on Multimedia and Expo (ICME), pp. 2151-2153, date Jul. 2004.

Cardoso, Bernardo et al., "Personalization of Interactive Objects in the GMF4iTV project", Retrieved from: <http://www.di.unito.it/~liliana/TV04/FINAL/merialdo.pdf> on Aug. 4, 2008—*TV'04, 4th Workshop on Personalization in Future TV held in conjunction with Adaptive Hypermedia 2004*, (Aug. 23, 2004), 13 pages.

Cruickshank, Leon et al., "Making Interactive TV Easier to Use: Interface Design for a Second Screen Approach", Retrieved from: <http://bura.brunel.ac.uk/bitstream/2438/2500/1/Design+Journal_iTV+paper_ET.pdf> on Aug. 4, 2008—*The Design Journal*, vol. 10, No. 3, 2007, 15 pages.

"Foreign Office Action", Chinese Application No. 200980138099.9, (Dec. 5, 2012), 11 pages.

\* cited by examiner

400 —

402
Identify, by a client, an object placed on a surface of the client that contains one or more user settings

404
Configure a user interface according to the one or more user settings

406
Output the user interface using at least a portion of the surface

408
Output another user interface that was configured using the one or more user settings using another client that is local to the client having the surface

*Fig. 4*

OBJECT DETECTION AND USER SETTINGS

BACKGROUND

Users have access to an ever increasing variety of content. Additionally, users are also continually exposed to different devices that may be used to interact with that content. For example, users were traditionally limited to accessing the Internet using desktop computers. However, users may now access the Internet using a variety of other devices, such as game consoles, personal digital assistants (PDAs), and mobile "smart" phones.

Accordingly, a user may utilize a variety of different devices to interact with a variety of different content. The traditional techniques that are available to interact with the content using the different devices, however, are often disjointed and impersonal. Consequently, the user's experience with content may vary from device to device, even when utilizing similar devices.

SUMMARY

Object detection and user setting techniques are described. In an implementation, an object placed on a surface of the client is detected by the client. A determination is made as to which of a plurality of users correspond to the detected object. One or more user settings are located that correspond to the determined user.

In an implementation, an object is identified that is placed on a surface of a client that contains one or more user settings. A user interface is configured according to the one or more user settings and the user interface is output using at least a portion of the surface.

In an implementation, the client includes a housing having a form factor of a table, a surface disposed on a tabletop of a housing, and one or more modules disposed within the housing. The one or more modules are configured to interact with a television over a local network connection and display content on the surface that relates to content that is currently displayed on the television. The one or more modules are also configured to detect one or more inputs from a user via the surface and control the display of the content on the surface using at least one of the inputs. The one or more modules are further configured to control the display of the content on the television using another one of the inputs.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

FIG. 4 is a flow diagram depicting a procedure in an example implementation in which an object placed on a surface of the client of FIGS. 1 and 2 includes user settings that are used to configure a user interface.

DETAILED DESCRIPTION

Overview

Object detection and user setting techniques are described. In an implementation, configuration of a user interface is based on one or more objects that are placed on a surface of a client. For example, the client may be configured to follow a form function of a table. The client may also include functionality to determine what objects are placed on a surface of the table, e.g., a table top. Identification of particular objects that have been placed on the surface may then be used to determine which user settings should be used to configure a user interface.

For example, a user may place a phone on a surface of the client. The phone may be detected and user settings that are stored on the phone may be used to configure a user interface, such as favorite channels for a television. In another example, an object that is placed on a table (e.g., a set of car keys that correspond to a particular car) may be used to locate user settings that correspond to that user. A variety of other examples are also contemplated, further discussion of which may be found in relation to the following sections.

In the following discussion, an example environment is first described that is operable to perform one or more techniques that pertain to object detection and user settings. Example procedures are then described which may be implemented using the example environment as well as other environments. Accordingly, implementation of the procedures is not limited to the example environment in the example environment is not limited to implementation of the example procedures.

Example Environment

Figure 1:
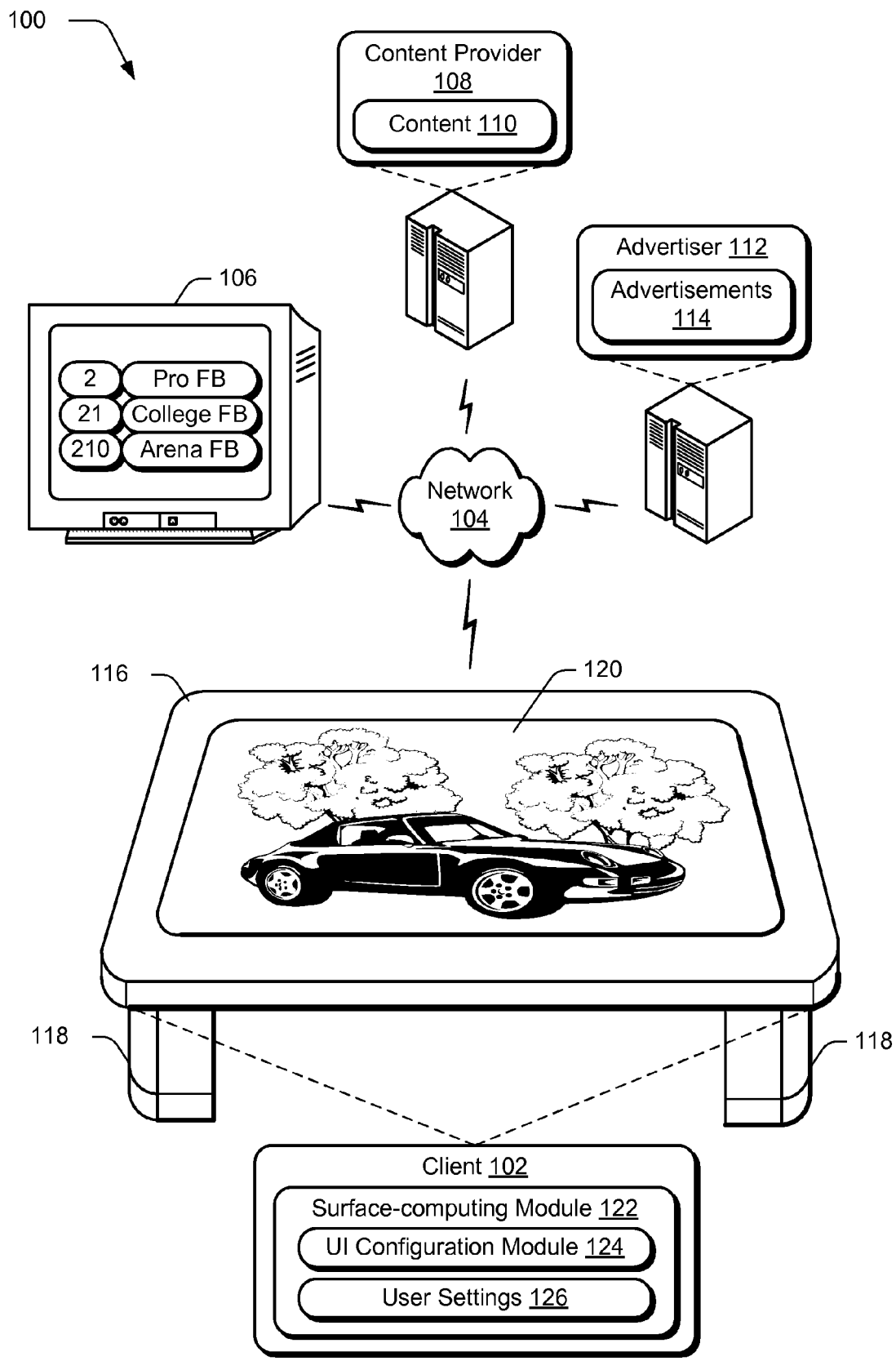
FIG. 1 is an illustration of an environment in an example implementation that is operable to perform object detection and user setting techniques.

FIG. 1 is an illustration of an environment 100 in an example implementation that is operable to employ techniques that pertain to object identification and user settings. The illustrated environment 100 includes a client 102 that is communicatively coupled via a network 104 to another client 106 configured as a television (accordingly reference may be made to the other client 106 or the television 106 in the following discussion), a content provider 108 having content 110, and an advertiser 112 having one or more advertisements 114.

The client 102 may be configured in a variety of ways. For example, the client 102 may be configured as a computer that is capable of communicating over the network 104, such as a desktop computer, a mobile station, an entertainment appliance, a set-top box communicatively coupled to a display device, a wireless phone, a game console, and so forth. Thus, the client 102 may range from full resource devices with substantial memory and processor resources (e.g., personal computers, game consoles) to a low-resource device with limited memory and/or processing resources (e.g., traditional set-top boxes, hand-held game consoles). The clients 102 may also relate to a person and/or entity that operate the clients. In other words, clients 102 may describe logical clients that include software and/or devices.

Although the network 104 is illustrated as the Internet, the network may assume a wide variety of configurations. For example, the network 104 may include a wide area network (WAN), a local area network (LAN), a wireless network, a public telephone network, an intranet, and so on. Further, although a single network 104 is shown, the network 104 may be configured to include multiple networks. For instance, the client 102 and another client 106 may be communicatively coupled via a local network connection, one to another. Additionally, the client 102 may be communicatively coupled to a content provider 108 over the Internet. Likewise, an advertiser 112 may be communicatively coupled to the content provider 108 via the Internet. A wide variety of other instances are also contemplated.

In the illustrated environment 100, the client 102 is illustrated as having a form factor of a table. The table form factor includes a housing 116 having a plurality of legs 118. The housing 116 includes a table top having a surface 120 that is configured to display one or more images, such as the car as illustrated in FIG. 1.

The client 102 is further illustrated as including a surface-computing module 122. The surface-computing module 122 is representative of functionality of the client 102 to provide computing related functionality that leverages the surface 120. For example, the surface-computing module 122 may be configured to output a user interface via the surface 120. The surface-computing module 122 may also be configured to detect interaction with the surface 120, and consequently the user interface. Accordingly, a user may then interact with the user interface via the surface 120 in a variety of ways.

For example, the user may use one or more fingers as a cursor control device, as a paintbrush, to manipulate images (e.g., to resize and move the images), to transfer files (e.g., between the client 102 and another client 106), to obtain content 110 via the network 104 by Internet browsing, to interact with another client 106 (e.g., the television) that is local to the client 102 (e.g., to select content to be output by the other client 106), and so on. Thus, the surface-computing module 122 of the client 102 may leverage the surface 120 in a variety of different ways both as an output device and an input device, further discussion of which may be found in relation to FIG. 2.

The client 102 is also illustrated as having a user interface (UI) configuration module 124 and user settings 126. The UI configuration module 124 is representative of functionality of the client 102 to configure a user interface using the user settings 126. For example, as previously described the surface-computing module 122 may act in conjunction with the surface 120 as an input device. Accordingly, objects placed on the surface 120 may be detected by the surface-computing module 122.

These objects may then be identified by the surface-computing module 122 to identify user settings 126 that correspond to the objects. For example, the object may be configured to maintain the user settings 126, such as a mobile phone of a user. Once the object has been detected, the user settings 126 may be retrieved from the object and used by the UI configuration module 124 to configure a user interface. In another example, the identification of the object may be user to locate corresponding user settings 126, such as by detecting a particular user's car keys and then retrieving the user settings 126 from storage that is local to the client 102 and/or remotely over the network 104.

A variety of different user interfaces may be configured using the user settings 126. For example, a user interface may be output via the surface 120 that is configured to control operation of the client 102. In another example, the user interface may be output by another client 106, such as an electronic program guide (EPG) on the television that is configured to include a user's favorite shows.

The UI configuration module 124 may also support a variety of functionality to enhance viewing of content output by another client 106, illustrated as the television in FIG. 1. For example, the client 102 and the other client 106 may communicate via the network 104 (e.g., directly via a local area network and/or indirectly via a remote server accessible via the Internet) to be aware of each other's state, one to another. When a television program is displayed via the other client 106 that is associated with an enhanced experience, the client 102 and display content that enhances the content displayed via the other client 106.

For example, additional information may be displayed during an event (e.g., such as a sporting event) to supplement the content currently being output via the other client 106. For instance, an output of a car race on the other client 106 as illustrated in FIG. 1 may be supplemented via the surface 120 of the client 102 by displaying statistics, a track layout, additional camera angles, and so on.

In another instance, multiple events may be tracked via the surface 120 of the client 102. A number of concurrent events, for example, may be tracked during a sporting event, such as video feeds, information, and so on. In this way, a user may be readily informed regarding additional content that may be available for output that is not currently being output by the other client 106.

In a further instance, an alert may be output via the surface 120 of the client 102, which may be specified via the user settings 126 of the client 102. The user settings 126 to specify a variety of different alert conditions, such as an occurrence of the specified action in a sporting event, a business relationship (e.g., a stock price), weather, and so on. Information relating to the alert may then be output via the surface 120 of the client 102 and/or the other client 106. A variety of other examples are also contemplated without departing from the spirit and scope thereof.

Generally, any of the functions described herein can be implemented using software, firmware (e.g., fixed logic circuitry), manual processing, or a combination of these implementations. The terms "module," "functionality," and "logic" as used herein generally represent software, firmware, or a combination of software and firmware. In the case of a software implementation, the module, functionality, or logic represents program code that performs specified tasks when executed on a processor (e.g., CPU or CPUs). The program code can be stored in one or more computer readable memory devices, further description of which may be found in relation to FIG. 2. The features of the surface techniques described below are platform-independent, meaning that the techniques may be implemented on a variety of commercial computing platforms having a variety of processors.

Figure 2:
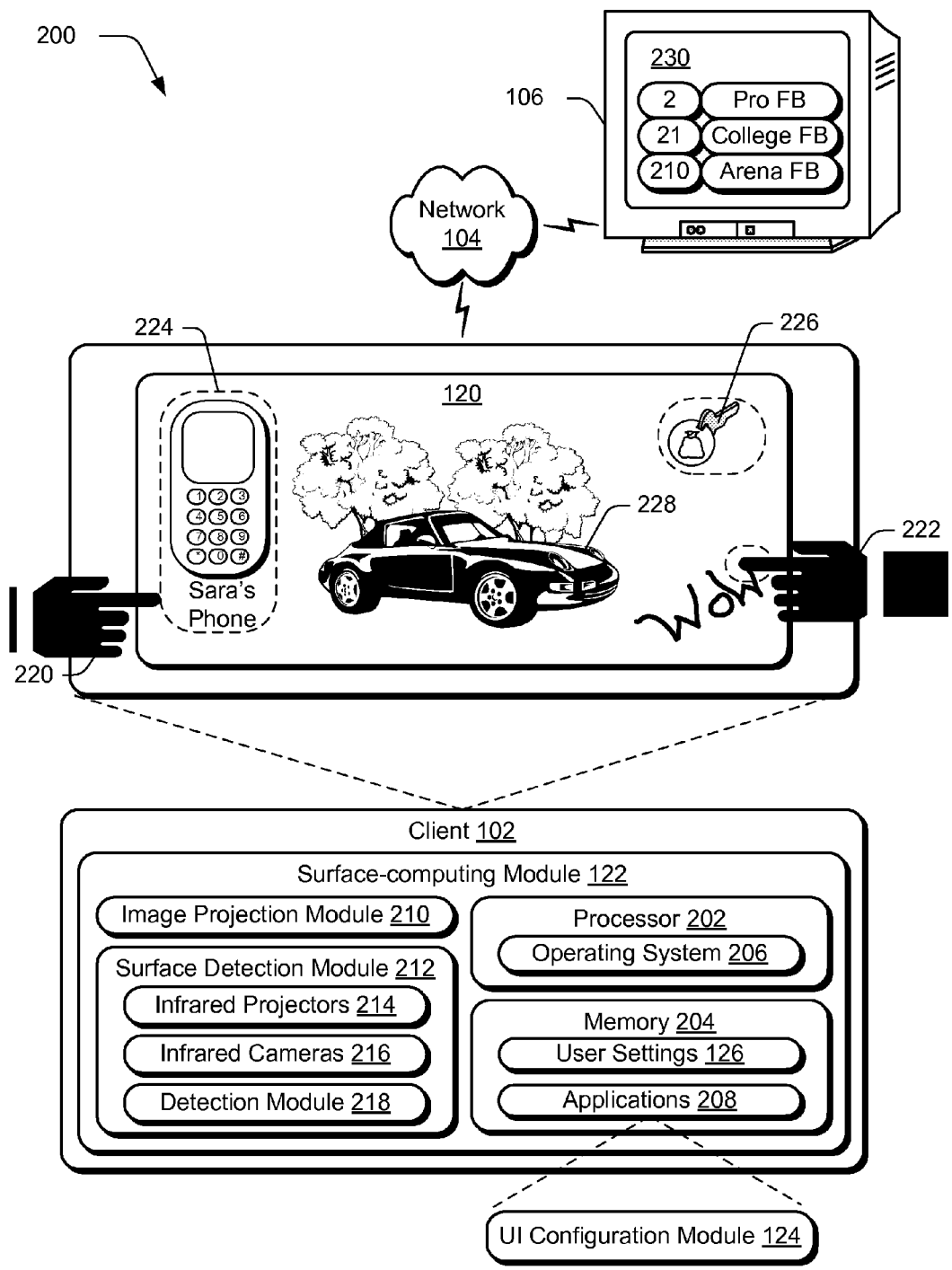
FIG. 2 is an illustration of a system in an example implementation showing a client of FIG. 1 in greater detail.

FIG. 2 depicts a system 200 in an example implementation showing the client 102 of FIG. 1 in greater detail. The client 102 includes the surface-computing module 122 of FIG. 1, which in this instance is illustrated as including a processor 202 and memory 204. Processors are not limited by the materials from which they are formed or the processing mechanisms employed therein.

For example, processors may be comprised of semiconductor(s) and/or transistors (e.g., electronic integrated circuits (ICs)). In such a context, processor-executable instructions may be electronically-executable instructions. Alternatively, the mechanisms of or for processors, and thus of or for a computing device, may include, but are not limited to, quantum computing, optical computing, mechanical computing (e.g., using nanotechnology), and so forth. Additionally, although a single memory 204 is shown, a wide variety of types and combinations of memory may be employed, such as random access memory (RAM), hard disk memory, removable medium memory, and other types of computer-readable media.

The client 102 is illustrated as executing an operating system 206 on the processor 202, which is also storable in memory 204. The operating system 206 is executable to abstract hardware and software functionality of the underlying client 102, such as to one or more applications 208 that are illustrated as stored in memory 204. In this system 200 of FIG. 2, the UI configuration module 124 is illustrated as one of the applications 208 that are stored in memory 204 of the client 102 with the user settings 126, e.g., the UI configuration module 124 is an executable module in the illustrated instance.

The surface-computing module 122 is also illustrated as including an image projection module 210 and a surface detection module 212. The image projection module 210 is representative of functionality of the client 102 to project an image onto the surface 120. A variety of different techniques may be employed by the image projection module 210 to project the image, such as through use of a rear projection system, an LCD, and so on.

The surface detection module 212 is representative of functionality of the client 102 to detect one or more objects when placed proximal to the surface 120. The surface detection module 212 may employ a variety of different techniques to perform this detection, such as radio frequency identification (RF ID), image recognition, barcode scanning, optical character recognition, and so on.

For example, the surface detection module 212 of FIG. 2 is illustrated as including one or more infrared projectors 214, one or more infrared cameras 216, and a detection module 218. The one or more infrared projectors 214 are configured to project infrared and/or near infrared light on to the surface 120. The one or more infrared cameras 216 may then be configured to capture images of the reflected infrared light output by the infrared projectors 214.

For instance, objects such as fingers of respective users' hands 220, 222, a user's phone 224, and keys 226 are visible by the infrared cameras 216 through the surface 120. In the illustrated instance, the infrared cameras 216 are placed on an opposing side of the surface 120 from the users' hands 220, 222, e.g., within a housing of the client 102. The detection module 218 may then analyze the images captured by the infrared cameras 216 to detect objects that are placed on the surface 120. An output of this analysis may then be provided to the operating system 206, the applications 208, and so on.

In an implementation, the surface detection module 212 may detect multiple objects at a single point in time. For example, the fingers of the respective users' hands 220, 222 may be detected for interaction with a user interface output by the operating system 206. In this way, the client 102 may support simultaneous interaction with multiple users.

The client 102 may also support gestures, which may be used to interact with the user interface. For example, different gestures may be used to expand an image, rotate an image, move files between devices, slept output of a particular item of content, and so on. Although detection using image capture has been described, a variety of other techniques may also be employed by the surface-computing module 122, and more particularly the surface detection module 212, to detect objects placed on or proximate to the surface 120 of the client 102, such as RFID, "sounding" techniques (e.g., ultrasonic techniques similar to radar), biometric (e.g., temperature), and so on. A variety of other techniques are also contemplated that may be used to leverage interaction with the surface 120 of the client 102 without departing from the spirit and scope thereof.

In an implementation, the UI configuration module 124 may leverage detection of objects on the surface 120 of the client 102. For example, a user may place keys 226 on the surface 120. The keys 226 may then be detected by the surface detection module 212, which may then output an indication that the keys 226 have been detected to the UI configuration module 124. This indication may be configured in a variety of ways, such as a numerical identifier that is unique to a brand of the keys 226, an image of the keys 226 for further processing by the UI configuration module 124, and so on.

The UI configuration module 124 may then identify the object placed on a surface 120 and used this identification as a basis for configuring a user interface. Continuing with the previous example, the UI configuration module 124 may identify a particular user that is associated with the keys 226 and locate user settings 126 that correspond to the particular user. A user interface may then be configured based on the user settings 126 and output via the surface 120. An example of this is illustrated in FIG. 2 as an image of a car 228 as a "background" that is output by the image projection module 210 on a surface 120. In another example, the user interface may be output by another client, such as an electronic program guide 230 output by the other client 106 that is communicatively coupled to the client 102 via the network 104. A variety of other examples are also contemplated, further discussion of which may be found in relation to the following procedures.

Example Procedures

The following discussion describes surface-computing techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1 and the system 200 of FIG. 2.

Figure 3:
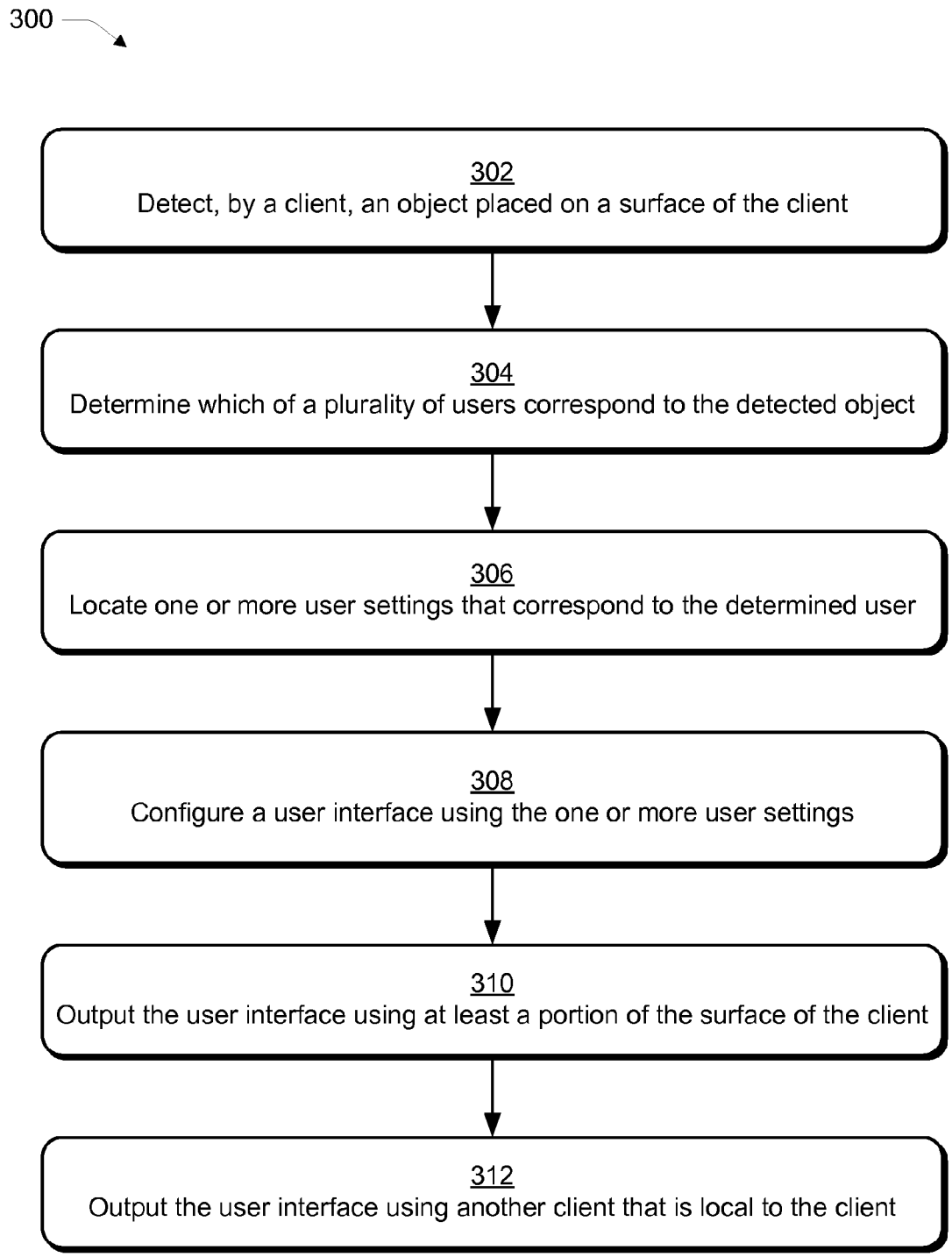
FIG. 3 is a flow diagram depicting a procedure in an example implementation in which a user interface is configured based on one or more user settings that are located based on detection of an object placed on a surface of a client.

FIG. 3 depicts a procedure 300 in an example implementation in which a user interface configured based on one or more user settings that are located based on detection of an object placed on a surface of a client. An object is detected that is placed on a surface of a client (block 302). The object may be detected in a variety of ways, such as through imaging techniques previously described in relation to FIG. 2, radio frequency identification techniques, "sounding" techniques (e.g., ultrasonic techniques), barcodes, optical character recognition (OCR), and so on.

Accordingly, a variety of different objects may be placed on the surface 120 of the client 102 for detection by the client 102. For example, one or more users' fingers of the users' hands 220, 222 may be placed on the surface 120 of the client 102, keys 226, a mobile phone, a wallet, and so on.

A determination is that made as to which of a plurality of users correspond to the detected object (block 304). The surface-computing module 122, for instance, may use image recognition and/or RFID techniques (e.g., by reading a unique identifier) to determine that the keys 226 correspond to a particular user. The surface-computing module 122 may then locate the user settings 126 that correspond to the particular user (block 306), e.g., from memory 204 is local to the client 102 and/or remotely via the network 104.

A user interface is configured using the one or more user settings (block 308). For example, the user settings 126 may specify "favorites" of the particular user (e.g., favorite channels, websites, music, actors, and so on), a particular background to be used in a user interface, settings particular to one or more applications 208, and so on.

Additionally, the user interface that is configured using the user settings 126 may be output in a variety of ways. For example, the user interface may be output using at least a portion of the surface of the client (block 310). In another example, user interface may be output using another client that is local to the client (block 312) such as the other client 106 of FIGS. 1 and 2. Accordingly, the user interface may be configured to provide interaction with the client 102 and/or the other client 106 that is illustrated as a television. For example, a user interface may be output via the surface 120 of the client 102 to control operation of the client 102 and/or the television, e.g., such as to change channels, increase or decrease volume, and so on. A variety of other examples are also contemplated without departing from the spirit and scope thereof.

FIG. 4 depicts a procedure 400 in an example implementation in which an object placed on a surface of the client 102 of FIGS. 1 and 2 includes user settings that are used to configure a user interface. An object placed on a surface of the client is identified, the object containing one or more user settings (block 402). A user may please a mobile phone on the surface 120 of the client 102. The surface-computing module 122 may then detect the presence of the mobile phone and initiate a local network connection (e.g., a local wireless connection) with the mobile phone. User settings that are contained in memory of the mobile phone may then be discovered by the surface-computing module 122. In this way, the user settings in the mobile phone may be readily transferred between clients.

A user interface is configured according to the one or more user settings (block 404) and the user interface is output using at least a portion of the surface (block 406). As previously discussed, the user settings 126 may be used by the UI configuration module 124 in a variety of different ways to configure a user interface. Thus, these user settings may then be used to personalize the user interface of the surface 120 of the client 102 that was used to detect the object that contained the settings.

In another example, another user interface may be output (that was configured using the one or more user settings) using another client that is local to the client having the surface (block 408). For instance, the other client 106 may output an electronic program guide (EPG) configured in accordance with one or more user settings 126 as illustrated in FIGS. 1 and 2, such as to specify an arrangement of television programs in the EPG. Though configuration of the user interface according to settings that correspond to a single user have been described, it should be readily apparent that the user interface may be configured using user settings that correspond to a plurality of users, further discussion of which may found in relation to the following figure.

Figure 5:
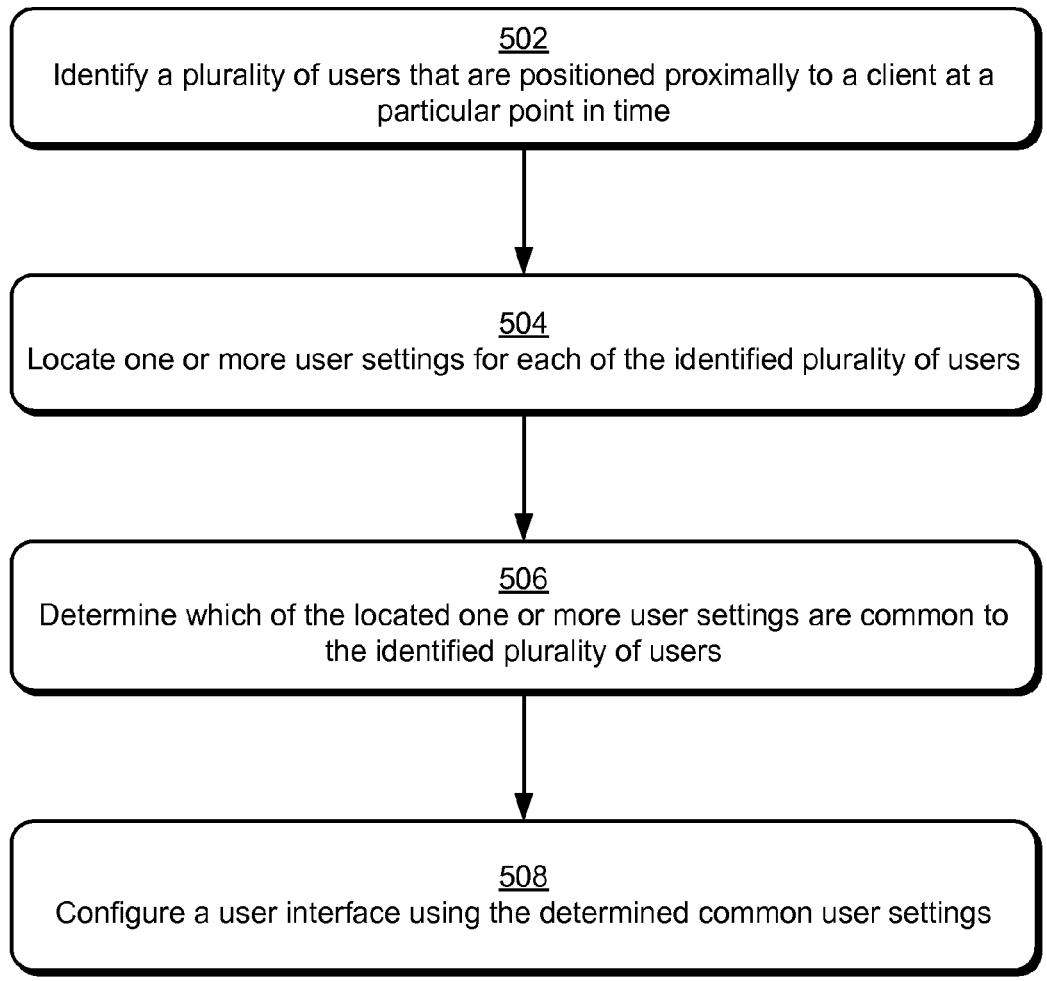
FIG. 5 is a flow diagram depicting a procedure in an example implementation in which user settings common to a plurality of users are used to configure a user interface.

FIG. 5 depicts a procedure 500 in an example implementation in which user settings common to a plurality of users are used to configure a user interface. A plurality of users is identified that are positioned proximally to a client 102 at a particular point in time (block 502). For example, the plurality of users may be positioned around the client 102 of FIG. 1 having a form factor of a table, in which, each of the users places an object on the surface 120 of the client 102 that may be used to identify the user using one or more of the techniques previously described. A variety of other techniques may also be employed, such as voice recognition, fingerprint scanning using the surface 120, and so on.

One or more user settings are located for each of the identified plurality of users (block 504), which may be performed using one or more of the previously described techniques. A determination is then made as to which of the located one or more user settings are common to the identified plurality of users (block 506). For example, the user settings of the users may indicate that interest in particular content is shared (e.g., television programs, music, and so on), particular genres, and so forth.

The user interface may then be configured using the determined common user settings (block 508). Continuing with the previous example, a "favorites" portion of an electronic program guide may be configured to include common favorites of the users, a background may be output on the surface 120 that corresponds to shared interests, and so on.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:
   detecting, by a client, an object placed on a surface of the client;
   determining whether the detected object is configured to maintain a plurality of user settings for configuring a user interface for display on the surface of the client and to communicate over a network connection;
   in response to a determination that the detected object is configured to maintain the plurality of user settings and communicate over the network connection:
      automatically initiating the network connection between the detected object and the client; and
      retrieving via electronic transfer over the network connection one or more of the plurality of user settings that correspond to one particular user from the detected object, the one or more settings enable the one particular user to be identified from a plurality of users;
   in response to a determination that the detected object is not configured to maintain user settings, using identification techniques via the surface to identify a unique identifier of the detected object that is usable to identify the one particular user from the plurality of users and locate the one or more user settings that correspond to the identified one particular user; and
   configuring the user interface for display on the surface of the client that is configured for direct user interaction via the surface of the client using the one or more user settings that correspond to the identified one particular user.

2. A method as described in claim 1, wherein:
   the client has a form factor of a table; and
   the surface is included as part of a table top of the client.

3. A method as described in claim 1, wherein:
   the detecting is performed for a plurality of said objects; and the configuring of the user interface is performed using the user settings that are common to the plurality of users.

4. A method as described in claim 1, wherein the detecting is performed through image recognition performed using one or more cameras of the client that are located below the surface of the client.

5. A method as described in claim 1, wherein the detecting is performed, at least in part, through barcode scanning or optical character recognition of at least a portion of the object.

6. A method as described in claim 1, wherein the detecting is performed, at least in part, by using one or more radio frequency identification techniques.

7. A method as described in claim 1, further comprising:
configuring the user interface using the one or more user settings, including settings that are particular to one or more applications; and
outputting the user interface using at least a portion of the surface of the client.

8. A method as described in claim 7, wherein the user interface is configured to control content output by another client that is local to the client having the surface.

9. A method as described in claim 7, wherein the user interface is an electronic program guide (EPG).

10. A method as described in claim 1, further comprising outputting the user interface using another client that is local to the client.

11. A method as described in claim 10, wherein the other client is a television.

12. A client comprising:
a housing having a form factor of a table;
a surface disposed on a table top of the housing; and
one or more modules disposed within the housing to:
  interact with a television over a local network connection;
  display content on the surface that relates to content that is currently displayed on the television;
  detect an object placed on the surface;
  determine whether the detected object is configured to maintain a plurality of user settings, including settings that specify favorites of a user, in a memory of the detected object and to communicate over a network connection;
  in response to a determination that the detected object is configured to maintain the plurality of user settings and communicate over the network connection:
    automatically initiate the network connection between the detected object and the client; and
    retrieve via electronic transfer over the network connection one or more of the plurality of user settings that correspond to one particular user from the memory of the detected object, the one or more settings enable the one particular user to be identified from a plurality of users;
  in response to a determination that the detected object is not configured to maintain user settings, use identification techniques via the surface to identify a unique identifier of the detected object that is usable to identify the one particular user from the plurality of users and locate the one or more user settings that correspond to the identified one particular user;
  detect one or more inputs from a user via the surface; and
  output a user interface via the surface that is configured for direct user interaction via the surface using the one or more user settings that correspond to the identified one particular user to:
    control the display of the content on the surface using at least one said input; and
    control the display of content on the television using another said input.

13. A client as described in claim 12, wherein the content displayed on the surface includes an alert set through interaction with the user interface output via the surface.

14. A client as described in claim 12, wherein:
the content displayed on the television is a sporting event; and
the content displayed on the surface includes statistics relating to the sporting event.

15. A client as described in claim 12, wherein:
the content displayed on the television is a television program; and
the content displayed on the surface is an internet chat that corresponds to the television program.

16. A client as described in claim 12, wherein the one or more modules include:
a rear-projection system to display the content on the surface;
one or more infrared projectors to project infrared light on the surface;
one or more infrared cameras to capture infrared images of the surface; and
a detection module to process the infrared images to detect the inputs.

17. One or more computer-readable memory devices comprising computer executable instructions that, responsive to execution by a computer, causes the computer to perform operations comprising:
detecting an object placed on a surface of the computer;
determining whether the detected object is configured to maintain a plurality of user settings in a memory of the detected object to configure a user interface for display on the surface of the computer, including settings that specify favorites of a user;
determining whether the detected object is configured to communicate over a network connection;
in response to a determination that the detected object is configured to maintain the plurality of user settings and communicate over the network connection:
  automatically initiating the network connection between the detected object and the computer; and
  retrieving via electronic transfer over the network connection one or more of the plurality of user settings that correspond to one particular user from the memory of the detected object, the one or more settings enable the one particular user to be identified from a plurality of users;
in response to a determination that the detected object is not configured to maintain user settings, using identification techniques via the surface to identify a unique identifier of the detected object that is usable to identify the one particular user from the plurality of users and locate the one or more user settings that correspond to the identified one particular user; and
configuring the user interface for display on the surface of the computer that is configured for direct user interaction via the surface of the computer using the one or more user settings that correspond to the identified one particular user.

18. One or more computer-readable memory devices as described in claim 17, wherein:
the detecting is performed for a plurality of said objects; and
the configuring of the user interface is performed using the user settings that are common to the plurality of users.

19. One or more computer-readable memory devices as described in claim 17, wherein the detecting is performed, at least in part, through barcode scanning or optical character recognition of at least a portion of the object.

20. One or more computer-readable memory devices as described in claim 17, wherein the detecting is performed, at least in part, by using one or more radio frequency identification techniques.

\* \* \* \* \*